(12) United States Patent
Bloom et al.

(10) Patent No.: US 8,345,099 B2
(45) Date of Patent: Jan. 1, 2013

(54) OPTICAL PATH PROTECTION DEVICE AND METHOD FOR A RAILROAD TRACK INSPECTION SYSTEM

(75) Inventors: Jeffrey A. Bloom, Silver Spring, MD (US); Antonio Aquino, Harrison City, PA (US); Anthony Kim, Laurel, MD (US); Jacobus McKenzie, Falls Church, VA (US); Jennifer Steets, Orrtanna, PA (US)

(73) Assignee: ENSCO, Falls Church, VA (US)

( * ) Notice: Subject to any disclaimer, the term of this patent is extended or adjusted under 35 U.S.C. 154(b) by 353 days.

(21) Appl. No.: 12/693,143

(22) Filed: Jan. 25, 2010

(65) Prior Publication Data

US 2011/0181721 A1     Jul. 28, 2011

(51) Int. Cl.
*H04N 7/18* (2006.01)
(52) U.S. Cl. .......................................... 348/148
(58) Field of Classification Search .................. 348/148
See application file for complete search history.

(56) References Cited

U.S. PATENT DOCUMENTS

| | | | |
|---|---|---|---|
| 3,168,023 A * | 2/1965 | Harmon | 396/19 |
| 4,915,504 A * | 4/1990 | Thurston | 356/604 |
| 5,140,776 A | 8/1992 | Isdahl et al. | |
| 6,064,428 A | 5/2000 | Trosino et al. | |
| 6,278,484 B1 * | 8/2001 | Oosaka et al. | 348/96 |
| 6,995,556 B2 | 2/2006 | Nejikovsky et al. | |
| 7,389,694 B1 | 6/2008 | Hay et al. | |
| 7,616,329 B2 | 11/2009 | Villar et al. | |
| 2004/0263624 A1 | 12/2004 | Nejikovsky et al. | |

* cited by examiner

*Primary Examiner* — Joseph Avellino
*Assistant Examiner* — Marshall McLeod
(74) *Attorney, Agent, or Firm* — Finnegan, Henderson, Farabow, Garrett & Dunner, LLP

(57) ABSTRACT

A railroad track inspection system and method for facilitating inspection of a rail component while traveling on the railroad track. The railroad track inspection system includes an optical path protection device for a protective window for optical sensors of an optical inspection system when it becomes contaminated with dirt, dust, mud, grease, and other contaminants that block or obscure an optical path of the sensors. The optical path protection device eliminates the need for a human operator to perform the periodic cleaning of the protective window by using a clear film with an automated advancement mechanism for providing clean film, as needed, for keeping the optical path of the optical sensors unobstructed and clear.

42 Claims, 4 Drawing Sheets

OPTICAL PATH PROTECTION DEVICE AND METHOD FOR A RAILROAD TRACK INSPECTION SYSTEM

BACKGROUND

1. Technical Field

This invention relates to a non-contact, optical-based track inspection system including a vehicle for travel on the track and an inspection unit mounted on the vehicle.

2. Description of Related Art

Maintaining proper conditions of rail components of a railroad track is of paramount importance in the railroad transportation industry. Rails of the railroad track are subject to movement and wear due to the passage of trains over the rails, especially with heavy freight trains. Changes in track geometry and cracks are common defects and anomalies created in the rails of the railroad track by the passage of heavy rolling stock over the rails. Conditions of the railroad track greatly impact safety and reliability of rail transportation. Failure or degradation of various rail components, such as cross ties, joint bars, fasteners, switch frogs, and rail fasteners, as well as the rail segments themselves, can cause derailment of a train traveling on the railroad track. Such derailment can cause significant property damage, and injury to passengers and crew aboard the derailed train.

To inspect the railroad track for various anomalies and to ensure that all rail components are in good condition, an optical inspection system may be used for non-contact measurements of the railroad track. Such a system may be mounted under an inspection car and may include optical sensors such as video cameras and lasers. Lasers and lamps are utilized to emit a beam of light across the railroad track. The laser produces a projected line that is substantially straight and extends substantially perpendicular to the surface of the railroad track. Cameras may be mounted at an angle with respect to the beam of light projected from the lasers. As the inspection system moves along the railroad track, the video camera captures images of the railroad track illuminated by the beam of light, thereby acquiring measurements and profiles of the railroad track. Optical inspection systems provide a high level of accuracy but have inherent weather and reliability limitations. In the railroad environment, a clear glass or plastic window of an enclosure containing optical sensors can become contaminated with dirt, dust, mud, grease, and other contaminants that block or obscure an optical path of the optical sensors. Accordingly, the protective window of the optical sensors requires periodic cleaning.

In some cases the inspection car can be stopped and the protective window of the optical sensors can be manually cleaned by an operator. However, this is a time-consuming operation, and is often not possible or desirable due to constraints of the railroad system. On unmanned systems an automatic cleaning system is necessary since manual cleaning is not possible. Other railroad track inspection systems utilize high pressure air to blow off contaminants. However, such a method requires a large air compressor or blower and often is ineffective for heavy dirt and grease particles. A high pressure water spray has also been used for cleaning the protective window of the optical sensors; however, this requires a large water tank with periodic filling of water and anti-freeze. Furthermore, some railroad track inspection systems utilize a windshield wiper to clean the protective window, but this can be ineffective unless used with a cleaning fluid stored in a tank. The windshield wiper also can smear heavy oils and grease.

Accordingly, there is a need to overcome the above disadvantages. There is a need for a device, system, and method for automatically cleaning a protective window for optical sensors to ensure a clear and unobstructed optical path for the optical sensors in a railroad track inspection system.

SUMMARY

The present invention meets these and other needs by providing an optical path protection device, system, and method for automatically cleaning a protective window for optical sensors contaminated with dirt, dust, mud, grease, and other contaminants that block or obscure the optical path in a railroad track inspection system. The invention eliminates the need for a human operator to perform the periodic cleaning of the protective window by using an automated advancement mechanism for providing clear film, as needed, in order to keep the optical path for the optical sensors unobstructed and clear.

In one aspect, a device mounted on a vehicle for travel on a railroad track includes a housing, the housing including a window for protecting an optical path of an optical sensor, an opening exposing the window, a film for covering at least the window, a first reel for storing the film, an advancing mechanism for advancing the film, and a second reel for receiving the film advanced from the first reel, the film being advanced across the optical path by unrolling the film stored on the first reel and collecting the film on the second reel.

In another aspect, a system for inspecting a railroad track includes a vehicle for travel on the railroad track; an inspection unit mounted on the vehicle for inspecting the railroad track, the inspection unit including an optical sensor for generating an output signal, the optical sensor including a light generator for projecting a beam of light along an optical path towards the railroad track, and an optical receiver for receiving at least a portion of the light reflected from the railroad track along the optical path and generating at least one image of at least a portion of the railroad track, the output signal including the at least one image; a protection unit for protecting the optical path from contaminants, the unit including a film for covering the optical sensor, a first reel for storing the film, an advancing mechanism for advancing the film, and a second reel for receiving the film advanced from the first reel; and a controller for controlling the advancing mechanism, the controller receiving the output signal and analyzing the at least one image in the output signal, the controller transmitting a control signal to the advancing mechanism, and the advancing mechanism receiving the control signal and advancing the film based on the control signal.

In another aspect, a method for inspecting a railroad track includes inspecting the railroad track using an inspection unit mounted on a vehicle for travel on the railroad track, the inspecting step further including generating an output signal using an optical sensor, the generating step further including projecting a beam of light along an optical path towards the railroad track using a light generator, and receiving at least a portion of the light reflected from the railroad track along the optical path and generating at least one image of at least a portion of the railroad track using an optical receiver; protecting the optical path from contaminants using a protection unit, the protecting step further including a film covering the optical sensor in whole or part, storing the film on a first reel, advancing the film using an advancing mechanism, and receiving the film advanced from the first reel using a second reel; and controlling the advancing mechanism using a controller, the controlling step further including receiving the output signal and analyzing the at least one image in the output signal, transmitting a control signal to the advancing mechanism, and receiving the control signal using the advancing mechanism and advancing the film based on the control signal.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

The accompanying drawings which are incorporated in and constitute a part of this specification, illustrate embodiments of the disclosed device, system, and method and, together with the description, serve to explain the principles of the optical path protection device and method for the railroad track inspection system.

It is to be understood that both the foregoing general description and the following detailed description are exemplary and explanatory only and are not restrictive of the scope of the invention as claimed.

DESCRIPTION OF THE DISCLOSED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

1. Railroad Inspection System

Figure 1:
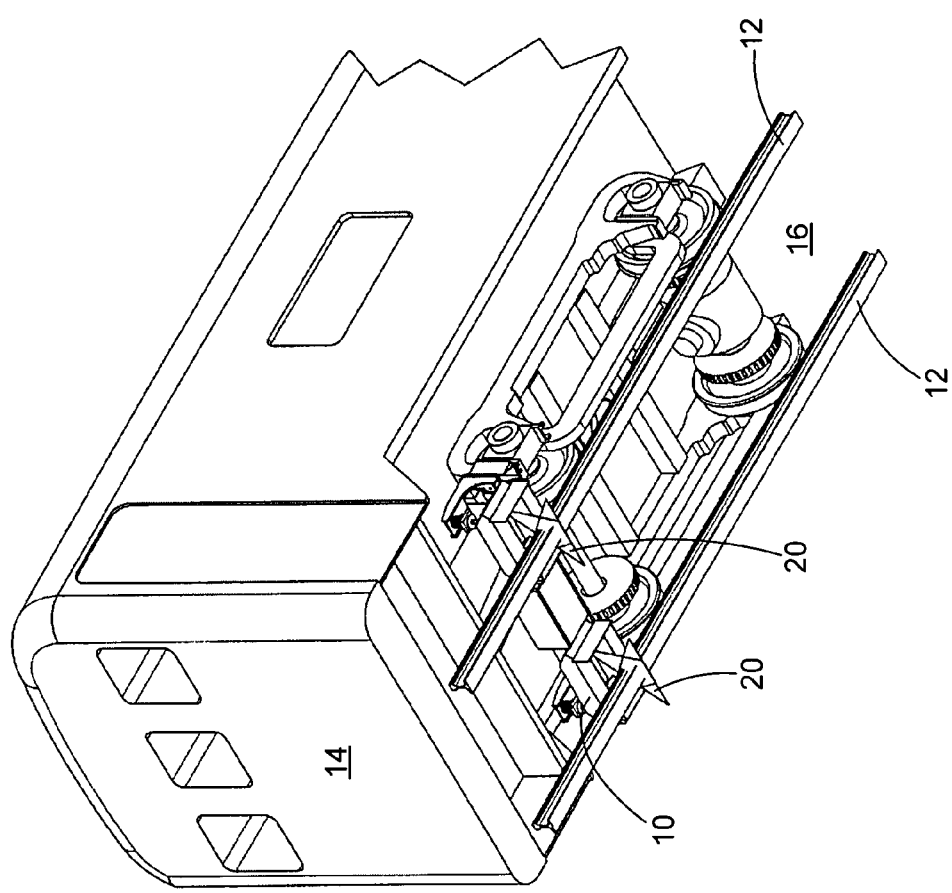
FIG. 1 is a schematic view of a railroad inspection vehicle with a railroad inspection system mounted underneath.

Referring to FIG. 1, a system 10 for inspecting railroad tracks according to the present disclosure is illustrated. In FIG. 1, the disclosed inspection system 10 is schematically illustrated relative to a railroad track 12. A railroad inspection vehicle 14, with the railroad inspection system 10 mounted underneath, is provided for automatically inspecting the railroad track 12 to detect anomalies. The types of anomalies detected by the inspection system 10 generally encompass anything that affects the structure of the railroad track 12 and the ability of trains to operate on the railroad track 12. In general, the inspection vehicle 14 can be any vehicle suitable for traveling along the railroad track 12. For example, a common practice in the art is to equip a normal highway vehicle, such as a pick-up truck, with "hi-rail" gear mounted to the frame of the vehicle. Hi-rail gear typically includes a set of undersized railroad stock wheels that allow the highway vehicle to ride along the rails. Alternatively, the inspection vehicle 14 can be maintenance-of-way equipment that is specifically designed for working along the railroad track 12 or any rail-bound rolling stock. Although the disclosed inspection system 10 and associated device and method are described for use in inspecting railroad tracks, it will be appreciated with the benefit of the present disclosure that the disclosed system, method, and device can be used in other areas and in industries where surfaces or components require inspection and maintenance. For example, the disclosed inspection system, method, and device can be used to inspect roads, electrical lines, piping, steel mills, etc. The disclosed inspection system utilizes many of the same components as these other systems and detects anomalies of approximately the same size.

Figure 4:
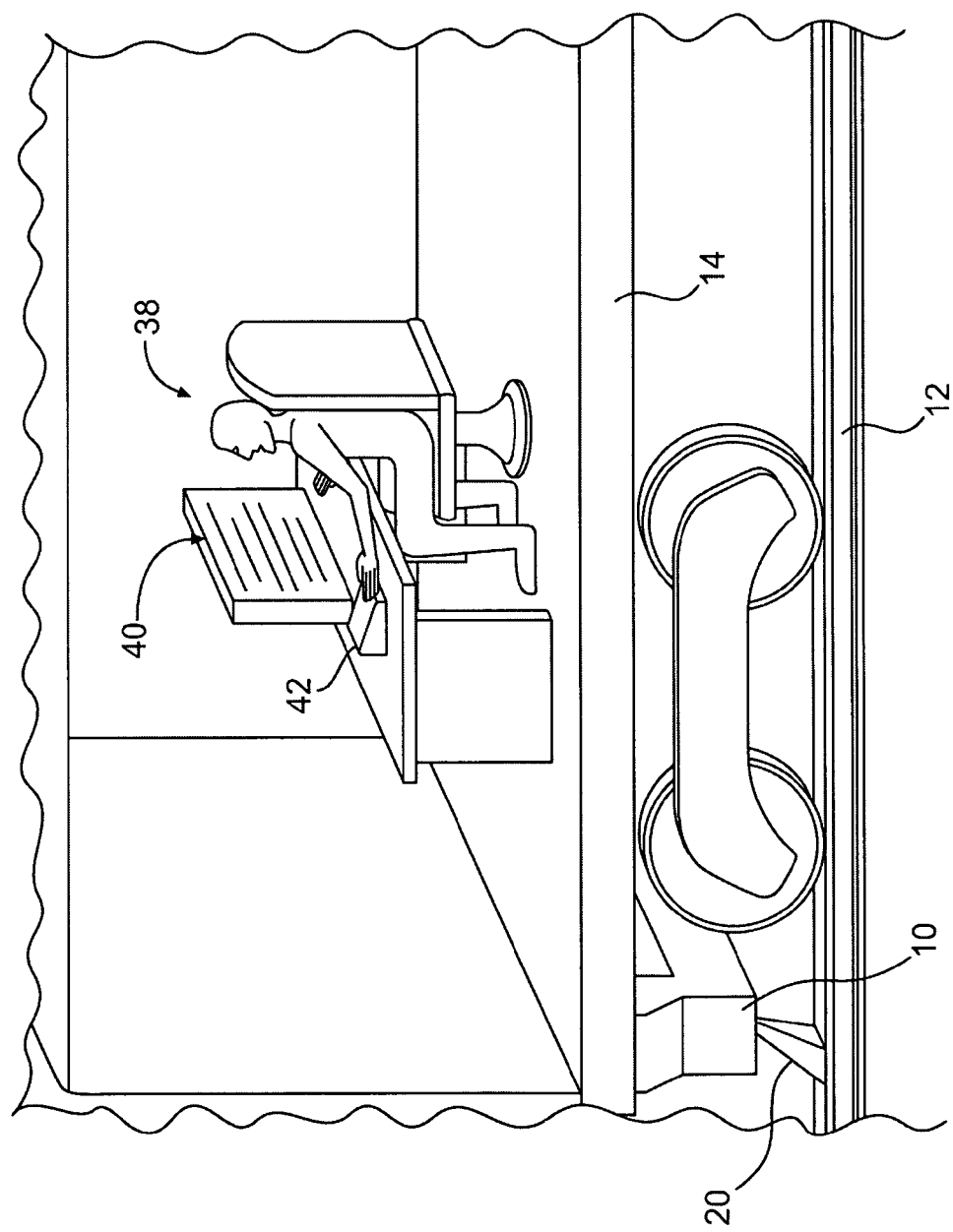
FIG. 4 is a schematic view of the railroad inspection vehicle with a control system and the railroad inspection system mounted underneath.

The inspection system 10 is adapted to facilitate inspection of a rail component while traveling on the railroad track 12 using an optical inspection system. The optical inspection system includes an optical sensor, such as a laser or a lamp (not illustrated), which is a light generator or source that provides illumination to a rail of the railroad track, and an optical receiver, such as a camera (not illustrated), mounted on the inspection vehicle 14, which is adapted to provide an image of the illuminated rail component. The light source may optionally be a natural source, such as the sun. All of these optical components may be located under the inspection vehicle 14. Referring to FIG. 4, the inspection system 10 may be further connected to a controller, such as a computer 40, which is adapted to capture and analyze the image provided by the camera based on an output signal from the sensor.

Figure 2:
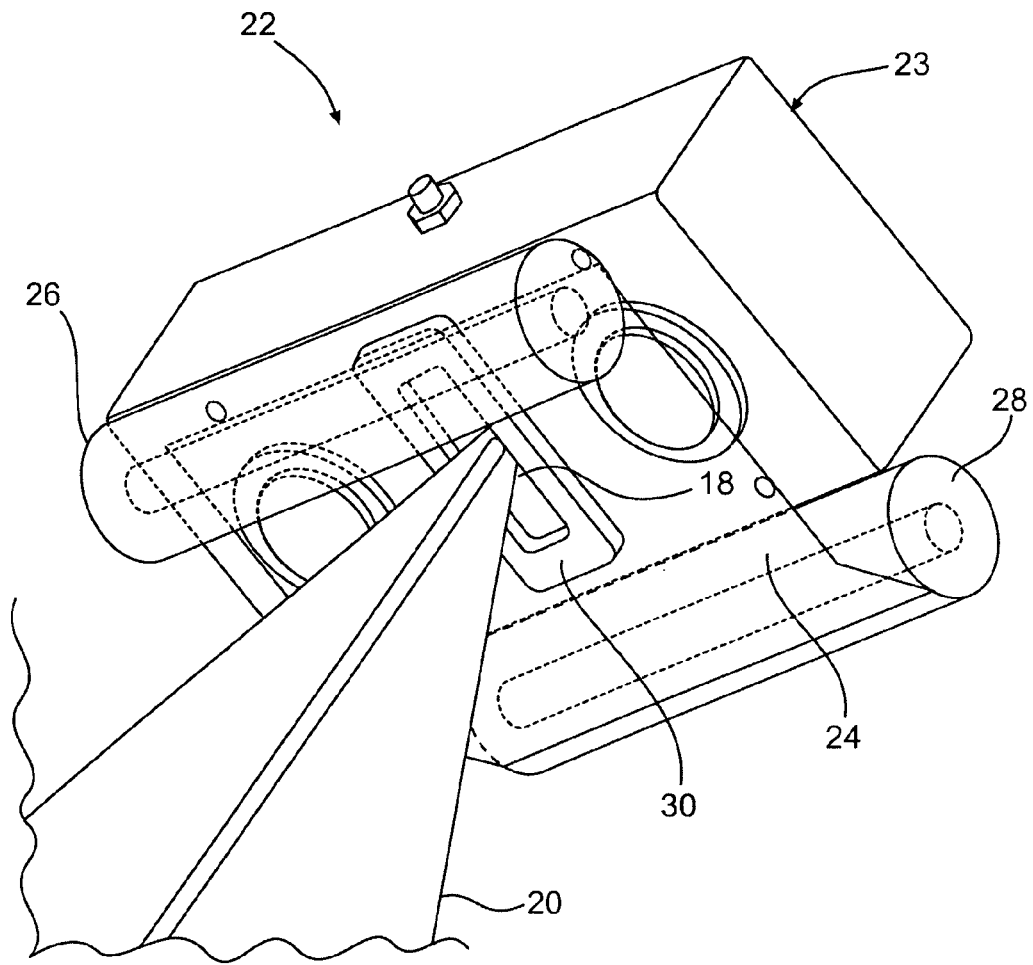
FIG. 2 is a schematic view of an optical path protection device of FIG. 1.

Referring to FIG. 2, as a routine matter during railroad track 12 inspection, a protective window 18 for the optical sensors can readily become contaminated with dirt, dust, mud, grease, and other contaminants that block or obscure an optical path 20 of the optical sensors due to the railroad environment 16. Accordingly, an optical path protection device, system, and method for periodic cleaning of the protective window 18 for the optical sensors is required.

2. Optical Path Protection Device

The present railroad inspection system 10 eliminates the need for a human operator to perform the periodic cleaning of the protective window 18 for the optical sensors. Referring to FIG. 2, the disclosed optical path protection device 22 is housed in an optical cartridge 23 and includes a clear protective film 24, a supply reel 26, a take-up reel 28, and an advancement mechanism. The protective film 24 is stored on the supply reel 26 and moves across the optical path 20 of the optical sensors to the take-up reel 28. The optical cartridge 23 has at least one opening 30 exposing the protective window 18 for the optical sensors. Alternatively, FIG. 3 illustrates the optical cartridge 23 with a plurality of openings 30.

The protective film 24 of the optical path protection device 22 creates a sealed boundary between the railroad environment 16 and the protective window 18 for the optical sensors, preventing contaminants from reaching the protective window 18. The movable protective film 24 is placed between the railroad environment 16 and the opening 30 of the optical cartridge 23, covering and protecting the protective window 18 for the optical sensors. The protective film 24 is provided with an automated advancement mechanism for providing clean protective film, as needed, in order to keep the optical path 20 of the optical sensors clear. Contaminants, including dust, dirt, mud, water, grease, oil, and stones, that contact the protective film 24 either adhere to or are repelled by the protective film 24. When the protective film 24 becomes contaminated to the point at which the contaminants start to obscure the optical path 20 of the optical sensors, the protective film 24 of the optical path protection device 22 is advanced past the optical path 20 by unrolling the protective film 24 from the supply reel 26 and taking up the contaminated protective film 24 on the take-up reel 28. The medium used for the protective film 24 must be transparent at an appropriate wavelength and must maintain its basic properties at all operating temperatures. For example, the material of the protective film 24 must be capable of being pulled through the optical path protection device 22 without changing a thickness of the protective film 24. Further, the protective film 24 must be resistant to warping as it transits the optical path 20 of the optical sensors. Polymeric materials that can be used for the protective film 24 include, but are not limited to, polycarbonate, vinyl, polyvinylchloride, acrylic, or other polymers. The appropriate material is selected based on the operating environment.

The optical cartridge 23 itself can be replaced periodically when the protective film 24 is used up, or the supply reel 26 of the cartridge 23 can be recharged with a new protective film 24 when empty. As illustrated in FIG. 3, for example, the cartridge 23 fits into a rigid holder 32. The cartridge 23 illustrated in FIG. 2 may also fit into the holder 32. The holder 32, along with the optical cartridge 23, are designed to seal a film boundary 36 and prevent the contaminants from reaching the optical sensor. The holder 32 can be mounted on the inspection vehicle 14 moving along the railroad track 12 so as to maintain the inspection system 10 in the proper position. Referring to FIG. 1, the railroad inspection system 10 may be positioned at an angle and elevated relative to the rail on the railroad track 12. The optical cartridge 23 with the optical path protection device 22 may be secured to the holder 32 or other component of the inspection vehicle 14 or railcar in any appropriate manner including, but not limited to, brackets, fasteners, or other securing hardware.

Figure 3:
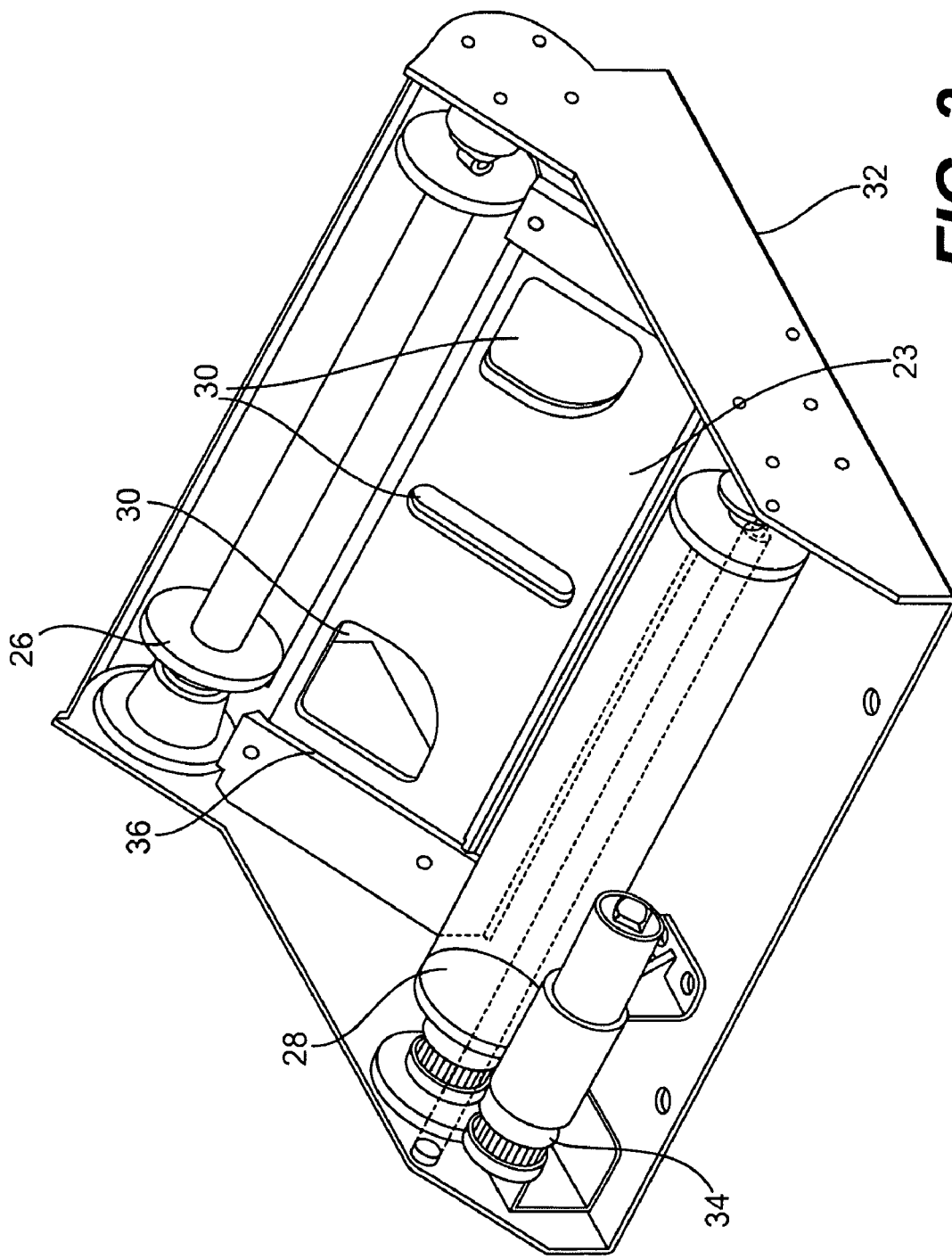
FIG. 3 is a schematic view of the optical path protection device mounted in a holder.

Referring to FIG. 3, the holder 32 further includes a motor drive 34 for advancing the protective film 24, as necessary. Alternately, the cartridge 23 itself may include the motor drive 34. The motor drive 34 is controlled by the controller 40. The controller 40 transmits control signals to the motor drive 34, instructing the motor drive 34 when to advance the protective film 24. The motor drive 34 uses an electric motor for incrementally advancing the protective film 24. A small motor, such as a DC permanent magnet motor, with an integral gear box is used to drive the take-up reel 28 through a gear or belt connection. The integral gear box is used to slow down the motor speed and increase the torque of the motor drive 34. Other motor drive arrangements for advancing the protective film 24, such as cylinders or actuators, can also be used.

3. Method for Advancing the Protective Film

The optical path protection device 22 periodically cleans the optical path 20 of the optical system in a semi-automatic or an automatic fashion. Referring to FIG. 4, advancement of the protective film 24 of the optical path protection device 22 may be controlled by an operator 38 in the inspection vehicle 14. After the disclosed inspection system 10 completes a survey of the railroad track 12, computer analysis of the image data acquired by the camera of the optical system is performed. The computer analysis can be performed by a processing device or computer 40 located in the inspection vehicle 14. Alternatively, the computer analysis can be performed by another computer system having image processing software known in the art. The operator 38 in the inspection vehicle 14 can also review the images output from the optical inspection system to determine if the optical path 20 of the optical sensors has become obscured. If the operator 38 determines that the protective film 24 has become contaminated so as to obscure the optical path 20, such that the image quality of the image data received from the camera is below a predetermined threshold, the operator 38 presses an input device, such as a control button 42, and the protective film 24 of the optical path protection device 22 is advanced a predetermined distance. The motor drive 34 advances the protective film 24 past the optical path 20 by unrolling the protective film 24 from the supply reel 26 and taking up of the contaminated protective film 24 on the take-up reel 28.

The computer 40 of the illustrated embodiment is equipped with digital image processing software and/or hardware for facilitating analysis of the images of the rail components that have been captured and stored. Among other common components, the computer 40 includes a microprocessor, inputs, outputs, and a data storage device (not illustrated). The microprocessor formats the images so that they can be analyzed to determine various measurable aspects of the railroad track 12 pertinent to inspection. The data storage device can include a hard drive, a non-volatile storage medium, a flash memory, tape, CD-ROM, or comparable devices. The computer 40 can further include an input and a display for the operator 38 to input and review data and to operate the disclosed inspection system 10.

Alternatively, the optical path protection device 22 may include a completely automatic system for advancing the protective film 24. Three methods may be used for determining when to advance the protective film 24: a time-based method, a distance-based method, and an image quality-based method. In both the time- and distance-based methods, the protective film 24 is advanced a preset distance using the motor 34.

In the time-based advancement method, the protective film 24 is advanced according to either a periodic schedule (e.g., every 4 hours of clock time) or a measured duration of operation (e.g., every 3 hours of running time).

In the distance-based advancement method, the protective film 24 is advanced after the railroad inspection system 10 travels a specific distance. The optical path protection device 22 monitors the distance the railroad inspection system 10 travels. This distance is measured by a wheel revolution measuring electronic odometer. When a threshold is passed, the protective film 24 is advanced and the starting point is reset to the current location.

Finally, the optical path protection device 22 can be configured to advance the protective film 24 based on the quality of the image collected by the optical sensors of the optical inspection system. In this mode, an algorithm is used to detect poor image quality from the image data received from the camera. Specifically, the algorithm determines when the image quality of the image data has dropped below an acceptable level. When this condition exists, the protective film 24 is advanced until the image quality returns to an acceptable level. The image quality-based method has the advantage of only advancing the protective film 24 when necessary, thus maximizing the period between maintenance cycles for replenishing the supply reel 26. This method also minimizes the amount of invalid data collected by the measuring system by clearing the optical path 20 of the optical sensors as soon as an obstruction is detected.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed method may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A device mounted on a vehicle for travel on a railroad track, comprising:
    a housing, the housing including:
        a window for protecting an optical path of an optical sensor,
        an opening exposing the window,
        a protective film for covering at least the window,
        a first reel for storing the protective film,
        an advancing mechanism for advancing the protective film, and
        a second reel for receiving the protective film advanced from the first reel,
        wherein the protective film is advanced across the optical path by unrolling the film stored on the first reel and collecting the protective film on the second reel.

2. The device of claim 1, wherein the housing is a cartridge.

3. The device of claim 1, further comprising:
    a holder, the housing being mounted on the holder.

4. The device of claim 1, wherein the first reel is a supply reel and the second reel is a take-up reel.

5. The device of claim 1, wherein the protective film covers both the opening and the window.

6. The device of claim 1, wherein the advancing mechanism is a motor.

7. The device of claim 6, wherein the motor is mounted on a holder.

8. The device of claim 6, wherein the motor is mounted in the housing.

9. The device of claim 1, wherein the advancing mechanism is an actuator.

10. The device of claim 1, wherein the advancing mechanism is a cylinder.

11. The device of claim 1, wherein the housing is replaced when the first reel completes the unrolling of the protective film.

12. The device of claim 1, wherein the protective film comprises a polymeric material selected from polycarbonate, vinyl, polyvinylchloride, or acrylic.

13. The device of claim 1, wherein the housing includes a plurality of openings.

14. The device of claim 3, wherein the holder and the housing form a seal boundary preventing contaminants from contacting the optical sensor.

15. A system for inspecting a railroad track, the system comprising:
    a vehicle for travel on the railroad track;
    an inspection unit mounted on the vehicle for inspecting the railroad track, the inspection unit comprising:
        an optical sensor for generating an output signal, the optical sensor including:
            a light generator for projecting a beam of light along an optical path towards the railroad track, and
            an optical receiver for receiving at least a portion of the light reflected from the railroad track along the optical path and generating at least one image of at least a portion of the railroad track,
            wherein the output signal includes the at least one image;
        a protection unit for protecting the optical path from contaminants, the unit including:
            a protective film for covering the optical sensor,
            a first reel for storing the protective film,
            an advancing mechanism for advancing the protective film, and
            a second reel for receiving the protective film advanced from the first reel; and
    a controller for controlling the advancing mechanism,
    wherein the controller receives the output signal and analyzes the at least one image in the output signal,
    wherein the controller transmits a control signal to the advancing mechanism, and
    wherein the advancing mechanism receives the control signal and advances the film based on the control signal.

16. The system of claim 15, wherein the controller determines an image quality of the at least one image, and
    wherein the controller transmits the control signal when the image quality is below a predetermined threshold.

17. The system of claim 16, wherein the controller includes an algorithm for determining the image quality of the at least one image.

18. The system of claim 15, wherein the controller transmits the control signal after a predetermined period of time.

19. The system of claim 15, wherein the controller transmits the control signal after the vehicle travels a predetermined distance.

20. The system of claim 15, further comprising:
    an input device for generating an input signal;
    wherein the controller receives the input signal and generates the control signal in response to the input signal.

21. The system of claim 20, wherein the input device is a control button.

22. The system of claim 15, wherein the light generator is a laser and the optical receiver is a camera.

23. The system of claim 15, wherein the light generator is a lamp and the optical receiver is a camera.

24. The system of claim 15, wherein the film is advanced across the optical path by unrolling the protective film stored on the first reel and collecting the protective film on the second reel.

25. The system of claim 15, wherein the first reel is a supply reel and the second reel is a take-up reel.

26. The system of claim 15, wherein the advancing mechanism is a motor.

27. The system of claim 15, wherein the advancing mechanism is an actuator.

28. The system of claim 15, wherein the advancing mechanism is a cylinder.

29. A method for inspecting a railroad track, the method comprising the steps of:
    inspecting the railroad track using an inspection unit mounted on a vehicle for travel on the railroad track, wherein the inspecting step further includes:
        generating an output signal using an optical sensor, wherein the generating step further includes:
            projecting a beam of light along an optical path towards the railroad track using a light generator, and
            receiving at least a portion of the light reflected from the railroad track along the optical path and generating at least one image of at least a portion of the railroad track using an optical receiver;
        protecting the optical path from contaminants using a protection unit, wherein the protecting step further includes:
            covering the optical sensor using a protective film, storing the protective film on a first reel, advancing the protective film using an advancing mechanism, and receiving the protective film advanced from the first reel using a second reel; and controlling the advancing mechanism using a controller, wherein the controlling step further includes:

receiving the output signal and analyzing the at least one image in the output signal, transmitting a control signal to the advancing mechanism, and receiving the control signal using the advancing mechanism and advancing the protective film based on the control signal.

30. The method of claim 29, wherein the controlling step includes:

determining an image quality of the at least one image, and transmitting the control signal when the image quality is below a predetermined threshold.

31. The method of claim 30, wherein the controlling step includes:

using an algorithm for determining the image quality of the at least one image.

32. The method of claim 29, wherein the controlling step includes:

transmitting the control signal after a predetermined period of time.

33. The method of claim 29, wherein the controlling step includes:

transmitting the control signal after the vehicle travels a predetermined distance.

34. The method of claim 29, further comprising:

generating an input signal using an input device;

wherein the controller receives the input signal and generates the control signal in response to the input signal.

35. The method of claim 34, wherein the input device is a control button.

36. The method of claim 29, wherein the light generator is a laser and the optical receiver is a camera.

37. The method of claim 29, wherein the light generator is a lamp and the optical receiver is a camera.

38. The method of claim 29, wherein the advancing the protective film step includes:

advancing the protective film across the optical path by unrolling the protective film stored on the first reel and collecting the protective film on the second reel.

39. The method of claim 29, wherein the first reel is a supply reel and the second reel is a take-up reel.

40. The method of claim 29, wherein the advancing mechanism is a motor.

41. The method of claim 29, wherein the advancing mechanism is an actuator.

42. The method of claim 29, wherein the advancing mechanism is an cylinder.

* * * * *